US012782953B2

(12) United States Patent
Baddam et al.

(10) Patent No.: US 12,782,953 B2
(45) Date of Patent: Nov. 3, 2026

(54) SYSTEM AND METHOD OF FUSING WIRELESS AND VISUAL FEATURES FOR ROBUST ROBOT STATE ESTIMATION

(71) Applicant: Robert Bosch GmbH, Stuttgart (DE)

(72) Inventors: Sandeep Reddy Baddam, Pittsburgh, PA (US); Sirajum Munir, Pittsburgh, PA (US); Jonathan Francis, Pittsburgh, PA (US); Sushanta Rakshit, Milpitas, CA (US); Martin Coors, Mountain View, CA (US); Samarjit Das, Wexford, PA (US); Vivek Jain, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 18/401,272

(22) Filed: Dec. 29, 2023

(65) Prior Publication Data

US 2025/0216852 A1 Jul. 3, 2025

(51) Int. Cl.

*G05D 1/243* (2024.01)
*G05D 1/247* (2024.01)
*G05D 111/10* (2024.01)
*G05D 111/30* (2024.01)
*H04W 4/029* (2018.01)

(52) U.S. Cl.

CPC ............. *G05D 1/243* (2024.01); *G05D 1/247* (2024.01); *H04W 4/029* (2018.02); *G05D 2111/10* (2024.01); *G05D 2111/32* (2024.01)

(58) Field of Classification Search

None

See application file for complete search history.

(56) References Cited

U.S. PATENT DOCUMENTS

2018/0113475 A1* 4/2018 Brazeau ............... G05D 1/0276
2020/0181879 A1* 6/2020 Halder .................. E02F 9/2054

FOREIGN PATENT DOCUMENTS

WO WO-2023240170 A1 * 12/2023 ........... G01C 21/206

OTHER PUBLICATIONS

"WiFi Fine Time Measurement (FTM) Round Trip Time (RTT) for indoor positioning," https://people.csail.mit.edu/bkph/ftmrtt_intro.

(Continued)

*Primary Examiner* — Christopher A Buksa

(74) *Attorney, Agent, or Firm* — Kathy Takeguchi; Maginot, Moore & Beck LLP

(57) ABSTRACT

A computer-implemented system and method relate to operating a mobile robot with respect to a reference location. First state data is generated using first sensor data obtained from a first set of sensors of a first sensor modality. Second state data is generated using second sensor data obtained from a second set of sensors. The second set of sensors provide wireless sensing. The second state data is generated from wireless features of the second sensor data. A first distribution of the first state data is generated. A second distribution of the second state data is generated. A posterior distribution is computed by fusing the first distribution and the second distribution. Optimal state data and associated uncertainty data is generated using the posterior distribution. The optimal state data includes a position estimate of the mobile robot. The mobile robot is controlled using at least the optimal state data.

18 Claims, 6 Drawing Sheets

(56) References Cited

OTHER PUBLICATIONS

"IEEE 802.11mc," https://en.wikipedia.org/wiki/IEEE_802.11mc.
Ibrahim et al., "Verification: Accuracy evaluation of WiFi fine time measurements on an open platform," Proceedings of the 24th Annual International Conference on Mobile Computing and Networking, 2018, pp. 417-427.
"Channel State Information," https://en.wikipedia.org/wiki/Channel_state_information.
He et al., "Deep Residual Learning for Image Recognition," Computer Vision Foundation, 2015, pp. 770-778.
Simonyan et al., "Very Deep Convolutional Networks for Large-Scale Image Recognition," ICLR 2015 arXiv:1409.1556v6 [cs.CV], Apr. 10, 2015, pp. 1-14.
Kotaru et al., "SpotFi: Decimeter Level Localization Using WiFi," 2015 ACM Conference on Special Interest Group on Data Communication, 2015, DOI: http://dx.doi.org/10.1145/2785956.2787487, pp. 269-282.
Mahfoudi et al., "Orion: Orientation Estimation Using Commodity Wi-Fi," ICC2017: WT03-5th IEEE ICC Workshop on Advances in Network Localization and Navigation (ANLN), 2017, 6 pages.
Papadopoulos et al., "Uncertainty estimation and Monte Carlo simulation method," Flow Measurement and Instrumentation 12 (2001), pp. 291-298.
Van Der Veen et al., "Getting started with uncertainty evaluation using the Monte Carlo method in R," https://doi.org/10.1007/s00769-021-01469-5, Accreditation and Quality Assurance (2021) 26, pp. 129-141.
Laurens et al., "Covariance matrix uncertainty analysis and correction," 68th International Astronautical Congress (IAC), Adelaide, Australia, Sep. 25-29, 2017, International Astronautical Federation (IAF), pp. 1-7.
"Random sample consensus," https://en.wikipedia.org/wiki/Random_sample_consensus.

* cited by examiner

FIG. 3
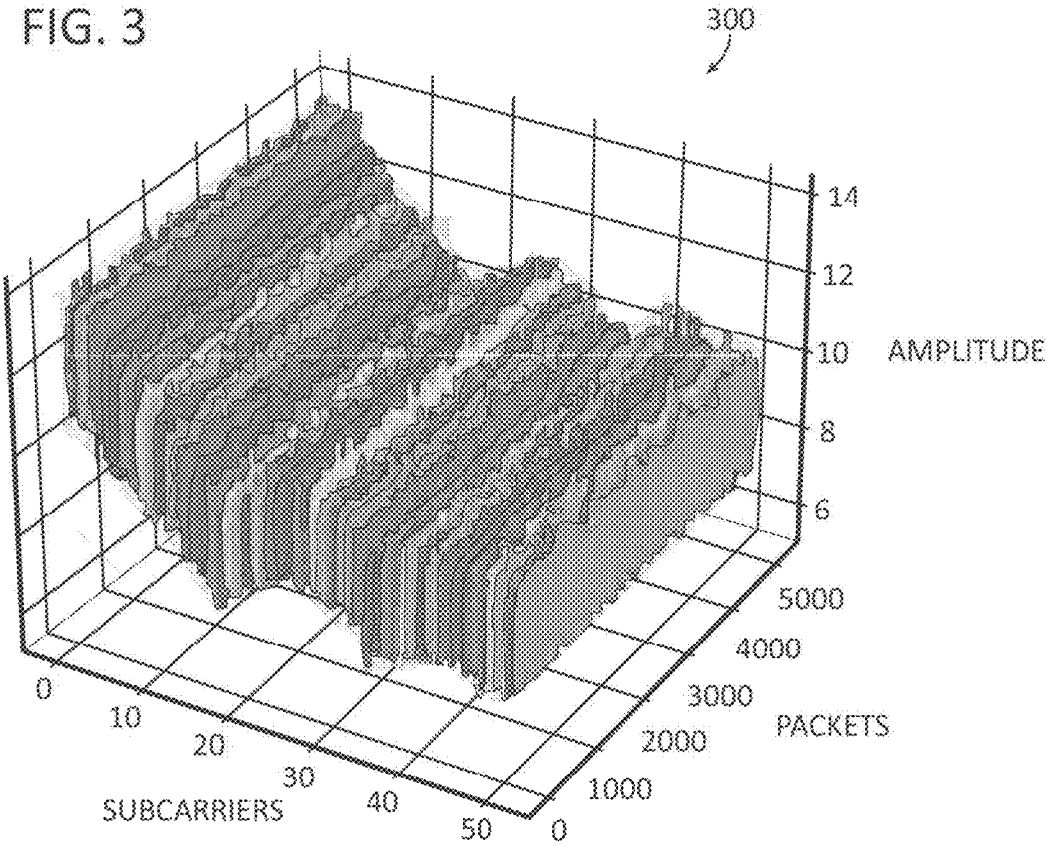
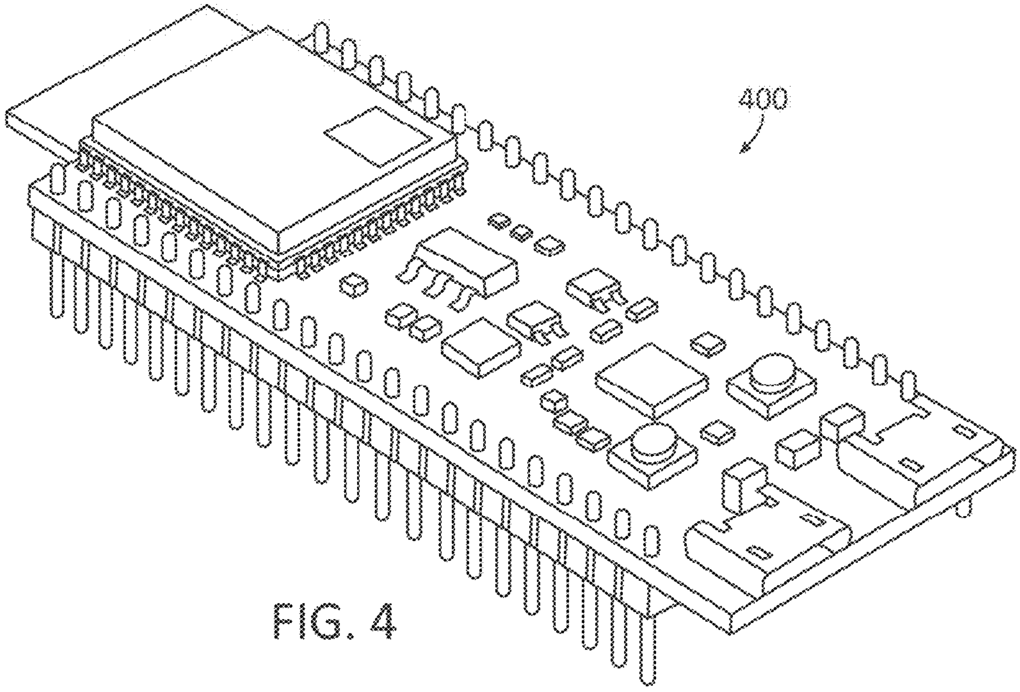
FIG. 4

SYSTEM AND METHOD OF FUSING WIRELESS AND VISUAL FEATURES FOR ROBUST ROBOT STATE ESTIMATION

GOVERNMENT RIGHTS

At least one or more portions of this invention may have been made with government support under U.S. Government Contract No. 80LARC21C0013, awarded by National Aeronautics and Space Administration (NASA). The U.S. Government may therefore have certain rights in this invention.

REFERENCE TO RELATED APPLICATIONS

The present application is related to the following patent applications: U.S. patent application Ser. No. 18/401,254 R410671, filed on Dec. 29, 2023) and U.S. patent application Ser. No. 18/401,248 R410678, filed on Dec. 29, 2023), which are both incorporated by reference in their entireties herein.

TECHNICAL FIELD

This disclosure relates generally to mobile robots, and more particularly to the state estimation of mobile robots using various sensors.

BACKGROUND

State estimation is crucial for a mobile robot to locate itself in a given environment and then traverse accordingly. In many navigation settings, the mobile robot may compute state estimation data using various sensor modalities, which may include Global Positioning System (GPS), camera, light detection and ranging (LiDAR), radio detection and ranging (RADAR), and inertial measurement unit (IMU). In various applications involving outdoor environments such as autonomous driving, field robotics, and aerial vehicle navigation, there is often a strong reliance on GPS as a form of granular state estimation. However, there are various places (e.g., various places on Earth, the moon, Mars, etc.) and/or various scenarios in which GPS is unreliable or unavailable, thereby affecting a mobile robot's ability to locate itself and navigate in such environments.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to operating a mobile robot with respect to a reference location. The method includes generating first state data using first sensor data obtained from a first set of sensors. The first set of sensors relating to a first sensor modality. The method includes generating second state data using second sensor data obtained from a second set of sensors. The second set of sensors provide wireless sensing. The second state data is generated from wireless features of the second sensor data. The method includes generating a first distribution of the first state data. The method includes generating a second distribution of the second state data. The method includes computing a posterior distribution by fusing the first distribution and the second distribution. The method includes generating optimal state data along with associated uncertainty data using the posterior distribution. The optimal state data includes a position estimate of the mobile robot. The method includes controlling the mobile robot using at least the optimal state data.

According to at least one aspect, a system includes one or more processors and one or more memory. The one or more memory are in data communication with the one or more processor. The one or more memory include computer readable data stored thereon. The computer readable data include instructions that, when executed by the one or more processors, performs a method for operating a mobile robot with respect to a reference location. The method includes generating first state data using first sensor data obtained from a first set of sensors. The first set of sensors relating to a first sensor modality. The method includes generating second state data using second sensor data obtained from a second set of sensors. The second set of sensors provide wireless sensing. The second state data is generated from wireless features of the second sensor data. The method includes generating a first distribution of the first state data. The method includes generating a second distribution of the second state data. The method includes computing a posterior distribution by fusing the first distribution and the second distribution. The method includes generating optimal state data along with associated uncertainty data using the posterior distribution. The optimal state data includes a position estimate of the mobile robot. The method includes controlling the mobile robot using at least the optimal state data.

According to at least one aspect, one or more non-transitory computer-readable media have computer readable data stored thereon. The computer readable data including instructions that, when executed by one or more processors, cause the one or more processors to perform a method for operating a mobile robot with respect to a reference location. The method includes generating first state data using first sensor data obtained from a first set of sensors. The first set of sensors relating to a first sensor modality. The method includes generating second state data using second sensor data obtained from a second set of sensors. The second set of sensors provide wireless sensing. The second state data is generated from wireless features of the second sensor data. The method includes generating a first distribution of the first state data. The method includes generating a second distribution of the second state data. The method includes computing a posterior distribution by fusing the first distribution and the second distribution. The method includes generating optimal state data along with associated uncertainty data using the posterior distribution. The optimal state data includes a position estimate of the mobile robot. The method includes controlling the mobile robot using at least the optimal state data.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

BRIEF DESCRIPTION OF THE FIGURES

FIG. 3 is a diagram of an example of a visualization of a sample of CSI data according to an example embodiment of this disclosure.

FIG. 4 is a diagram of an example of a wireless sensor of a mobile robot according to an example embodiment of this disclosure.

DETAILED DESCRIPTION

Figure 1:
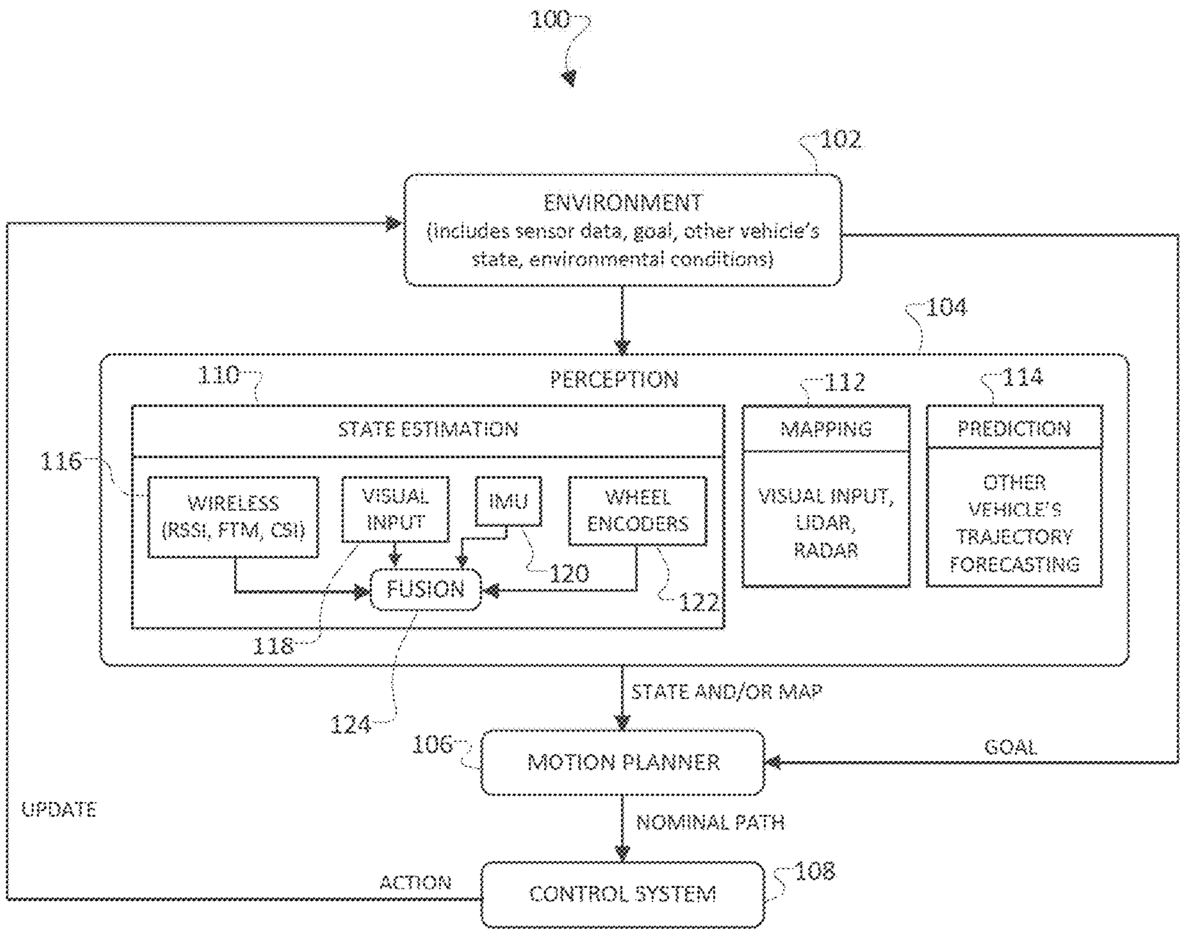
FIG. 1 is a flow diagram of an example of a process of a system according to an example embodiment of this disclosure.

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

This disclosure relates to settings where GPS is unreliable or unavailable, thereby enabling application to extraterrestrial and space deployments, such as lunar or Mars rovers. In this regard, this disclosure considers the example use-case of a rover that must perform smart-docking maneuvers on the surface of the moon. For these environments, visual odometry and fiducial tag-based state estimation are considered state-of-the-art techniques due to their ability to provide real-time estimates of robot position and orientation solely based on visual input, i.e., by using key visual features and fiducial markers, respectively. However, both are sensitive to image noise, due to environment dust and lighting conditions, especially in lunar settings; in addition, visual odometry is susceptible to positioning errors that accumulate over time. Meanwhile, state estimation techniques that rely on fiducial tags also face issues due to the agent's limited field-of-view, since tags may not always be visible during navigation.

To overcome these technical issues, the system 100 fuses wireless features with visual input for robust state estimation. This is done by incorporating Wi-Fi fingerprinting information using wireless features, e.g., Channel State Information (CSI), Received Signal Strength Indicator (RSSI), and Fine Time Measurement (FTM). These features can be obtained from wireless chips including but not limited to Wi-Fi, Ultra-wideband (UWB), and Bluetooth. Other features like Channel Impulse Response (CIR), Time of Flight (ToF) may also be used depending on the wireless sensing modality. By fusing wireless features with visual input, the system 100 accurately determines the current state of a mobile robot. Besides navigating in extraterrestrial environments, the system 100 is applicable to a wide range of terrestrial (on-earth) applications, such as indoor settings where GPS signals are also still unavailable—e.g., in commercial and residential settings, like warehouses and homes. In general, the system 100 may be applicable in any setting where one or more of the sensor modalities are unreliable, as in low-light conditions where cameras alone do not work and must be assisted by information from other modalities. In addition, the system 100 also works alongside and augments state estimation procedures that do include reliable GPS information: whereas GPS provides coarse-grained positioning estimates, the system 100 provides fine-grained information. Once the current state is estimated, the mobile robot is configured to make informed decisions, navigate effectively, and interact safely and intelligently with the world.

As discussed above, state estimation is essential for any mobile robot to understand and perceive its position and orientation, in relation to the environment, and then navigate effectively. TABLE 1 shows an extent to which various modalities may be used to estimate state data of a mobile robot in different environments. More specifically, in TABLE 1, "YES" refers to a sensor modality that is possible and reliable in the corresponding environment, "X" refers to a sensor modality that is not possible in the corresponding environment, and "*" refers to a sensor modality that is not reliable.

TABLE 1

RELIABILITY OF VARIOUS MODALITIES IN DIFFERENT ENVIRONMENTS

| MODALITY | EARTH INDOOR | EARTH OUTDOOR | MOON | MARS |
|---|---|---|---|---|
| LIDAR | YES | YES | * | YES |
| GPS | * | YES | X | X |
| IMU (ACC + GYR) | * | * | * | * |
| MAGNETOMETER | YES | YES | X | X |
| VISUAL ODOMETRY | YES | YES | * | YES |
| FUSION MODEL (WIRELESS FEATURES + VISUAL INPUT) | YES | YES | YES | YES |

In settings where GPS is unreliable, visual odometry and fiducial tag-based state estimation are considered state-of-the-art techniques for robot state estimation. More specifically, with respect to visual odometry, the process includes (i) feature detection, (ii) feature matching, (iii) motion estimation, (iv) RANSAC-based outlier rejection, and (v) pose accumulation. Feature detection includes identifying key visual features, such as corners or edges in consecutive frames of a camera i.e., a mobile robot's visual information. This can be done using methods like Harris corner detection or FAST (Features from Accelerated Segment Test). This is followed by computing descriptors, such as SIFT or ORB, to represent each detected feature. Also, feature matching includes matching corresponding features between frames to establish point correspondences. Meanwhile, motion estimation involves estimating the camera or mobile robot's motion (translation and rotation) between frames by analyzing the displacement of matched feature points. In addition, RANSAC-based outlier rejection involves identifying and removing outliers, which are mismatches or erroneous correspondences, using the RANSAC algorithm. Furthermore, pose accumulation involves accumulating estimated motion over time to determine the camera or mobile robot's state i.e., position and orientation relative to a starting reference frame. This process involves tracking visual features across consecutive frames and calculating the incremental camera motion between them. By accumulating these incremental motions over time, the camera's trajectory can be reconstructed, resulting in an estimation of the mobile robot's pose at each frame relative to the starting reference frame.

With respect to fiducial tag-based state estimation, the process involves fiducial tags (also known as visual markers), which are specially designed patterns or symbols placed in the environment to provide reference points for a mobile robot's perception system. These fiducial tags are typically designed to be easily detectable and distinguishable by cameras, thereby allowing mobile robots 200 to accurately recognize their position and orientation relative to the fiducial tags. Fiducial tags come in various forms, such as QR codes, barcodes, or specialized marker patterns like April Tags. The procedure for fiducial tag-based state estimation involves (i) detection, (ii) recognition, (iii) pose estimation, and (iv) iteration. Detection involves capturing images of the environment via a camera of the mobile robot 200 and performing image processing techniques, such as thresholding or edge detection, to identify the fiducial tags present in the scene. Recognition involves matching the detected fiducial tags against a known library of tag patterns to identify their unique IDs. Pose estimation involves using the known properties of the fiducial tags, such as their size and shape, along with the detected image coordinates to calculate pose data (e.g., position and orientation of each fiducial tag relative to the camera). Also, iteration involves repeating this process over time as new images are captured, thereby allowing for continuous updating of the state estimation of the mobile robot 200 based on the detection and recognition of fiducial tags in the scene.

In some cases, neither the visual odometry method nor fiducial tag-based state estimation method above will work all the time. Such cases include those where there is limited or ambiguous visual information, for example, when there are low-light conditions during the robot's operation. This visual corruption may lead to the accumulation of error ("drift") in the visual odometry or measurement jumps in the fiducial tag location estimates, making these approaches less reliable. To overcome these challenges, the system 100 fuses wireless features with visual input for more robust robot state estimation. This is done by incorporating Wi-Fi fingerprinting information using such wireless features as that which is obtained by processing the following signals: Received Signal Strength Indicator (RSSI), Fine Time Measurement (FTM), and Channel State Information (CSI).

FIG. 1 is a diagram that illustrates an example of a flow of information of the system 100 according to an example embodiment. In this example, the system 100 includes a set of modules. For example, the system 100 includes an environment module 102, a perception module 104, a motion planner 106, and a control system 108. The system 100 may include more modules or less modules than the number of modules illustrated in FIG. 1 provided that the set of modules perform at least the same or similar functions as described herein.

The environment module 102 is configured to receive and/or obtain environment data from an environment of the mobile robot. The environment data includes sensor data obtained via one or more sensors of the mobile robot, a state of the mobile robot, a goal (e.g., reference location, target location, or docking station location) of the mobile robot, environmental conditions (e.g., weather, temperature, etc.) of the environment of the mobile robot, etc. Upon obtaining this environment data relating to a current environment of the mobile robot, the environment module 102 transmits this environment data to the perception module 104.

The perception module 104 is configured to receive environment data from the environment module 102. The perception module 104 is configured to generate perception data using the sensor data. In the example shown in FIG. 1, the perception module 104 includes a state estimation module 110, a mapping module 112, and a prediction module 114.

The state estimation module 110 is configured to perform state estimation and generate state data, which include a position estimate of the mobile robot. The state estimation module 110 includes a set of sensor modules. Each sensor module corresponds to a particular sensor modality. For example, in FIG. 1, the state estimation module 110 includes a wireless module 116, a visual input module 118, an inertial measurement unit (IMU) module 120, and a wheel encoder module 122. In addition, the state estimation module 110 includes a fusion module 124, which is configured to fuse state estimation data and/or other related data received from a number of the sensor modules.

The wireless module 116 is configured to perform state estimation using wireless features. For example, the wireless module 116 is configured to extract wireless features obtained from one or more wireless sensors and generate state data including a position estimate using one or more of these wireless features. The wireless features include received signal strength Indicator (RSSI) data, fine tune measurement (FTM) data, channel state information (CSI) data, other wireless attributes, or any combination thereof.

The visual input module 118 includes fiducial tag-base state estimation. Fiducial tags are also known as visual markers, which are specially designed patterns or symbols placed in the environment to provide reference points for robot perception systems. These tags are typically designed to easily detectable and distinguishable by cameras allowing robots to accurately recognize their position and orientation relative to the tags. Fiducial tags come in various forms, such as QR codes, barcodes, specialized marker patterns like April Tags, etc.

A process for fiducial tag-based state estimation involves (1) detection, (2) recognition, (3) pose estimation, and (4) iteration. With respect to the first step of detection, the process includes capturing images, via a camera of the mobile robot, of the environment and performing image processing techniques (e.g., thresholding, edge detection, etc.) to identify the fiducial tags present in the scene. With respect to the second step of recognition, the process includes matching the detected fiducial tags against a known library of tag patterns to identify their unique IDs. With respect to the third step of pose estimation, the process includes using the known properties of the fiducial tags, such as their size and shape, along the detected image coordinates. A program calculates the pose (i.e., position and orientation) of each tag relative to the camera. With respect to the iteration step, this process is repeated over time as new images are captured, allowing for continuous updating of the robot's state estimation based on the detection and recognition of fiducial tags in the scene.

The visual input modality is used besides wheel odometry because, with skid-steer configuration, the robot turning rate is a function of both wheel velocities and skidding rate. As wheel odometry does not consider skidding, the corresponding state estimates are inaccurate. Thus, the fiducial tag-based modality may provide better state estimates that may be used in planning and control.

The IMU module 120 is configured to generate state estimation data using inertial measurement units. The IMU module 120 is configured to generate a position estimate using IMU data from one or more IMU sensors, which may include an accelerometer, a gyroscope, a magnetometer, etc.

The wheel encoder module 122 is configured to generate state estimation data using information obtained from wheels of the mobile robot. For instance, in an example, the mobile robot may comprise a four wheeled skid-steer configuration robot. The wheel encoders therefore comprise rotary encoders, which track motor shaft rotation to generate position and motion information based on wheel movement. The wheel encoder module 122 is therefore configured to generate state estimation data from wheel encoders and/or wheel odometry.

Also, as shown in FIG. 1, the perception module 104 includes the mapping module 112 and the prediction module 114. The mapping module 112 is configured to perform mapping actions relating to one or more sensors. For example, the mapping module 112 is configured to generate a map or perform mapping with respect to visual input, LIDAR, RADAR, etc. The prediction module 114 is configured to generate prediction data. As an example, the prediction data may relate to at least one other vehicle's trajectory forecasting and/or at least one other robot's trajectory forecasting. The mapping module 112 and the prediction module 114 are advantageous in ensuring that the system 100 is configured to navigate around its surroundings in an efficient and reliable manner without collision (e.g., colliding with another vehicle or robot).

As aforementioned, the perception module 104 is configured to generate perception data. The perception data includes state data (e.g. position estimate), a set of confident zone maps, and a unified confident zone map, or any combination thereof. The state data includes a position estimate such as (x, y, θ), where x and y are cartesian position coordinates of the mobile robot and where θ is an orientation of the robot. Also, the perception module 104 includes known sensor models (i.e., mathematical models that describes the relation between the actual sensor output and the robot state in global frame) for all the sensor modalities. In addition, the perception module 104 is configured to transmit the perception data to the motion planner 106. The perception module 104 is also configured to transmit (i) the mapping data from the mapping module 112 and/or (ii) prediction data from the prediction module 114, to the motion planner 106.

The motion planner 106 is configured to receive perception data from the perception module 104 and environment data from the environment module 102. The motion planner 106 is also configured to receive mapping data from the mapping module 112 and prediction data from the prediction module 114. The motion planner 106 is configured to generate motion planning data using the perception data and the environment data. The motion planning data includes a nominal path for the mobile robot. The motion planning data includes at least one control command for the mobile robot. The control command includes a plan for navigating the mobile robot. The control command specifies a linear velocity of the mobile robot and an angular velocity of the mobile robot. The motion planner 106 is configured to transmit the motion planning data to the control system 108.

The control system 108 is configured to receive motion planning data from the motion planner 106. For example, the motion planning data includes a nominal path for the control system 108 to control a movement of the mobile robot. In response to receiving the motion planning data, the control system 108 is configured to transmit a control signal and/or perform an action that advances the mobile robot according to the nominal path. In addition, the control system 108 is configured to update the environment module 102.

Figure 2:
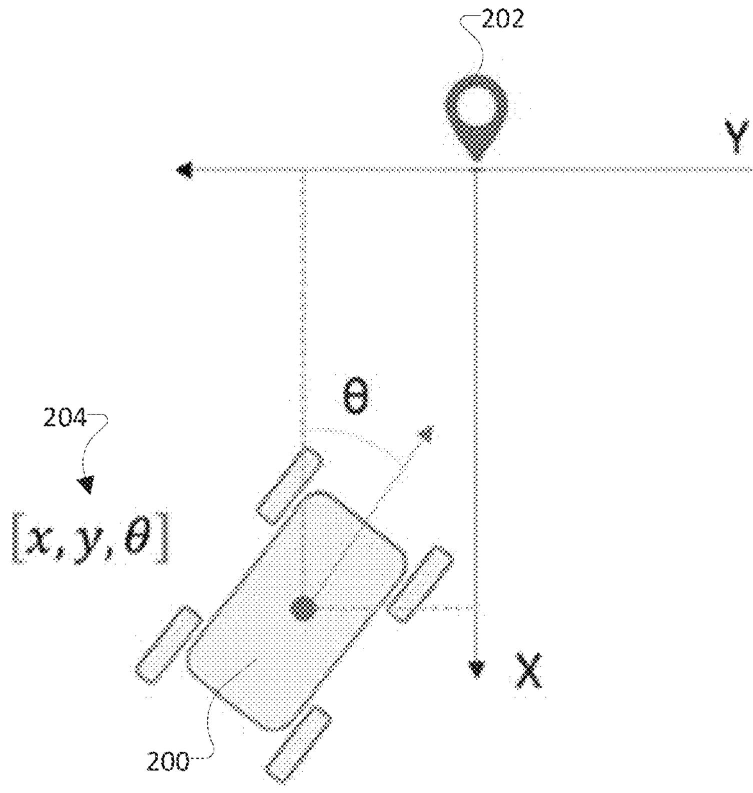
FIG. 2 is a diagram of an example of a state of a mobile robot according to an example embodiment of this disclosure.

FIG. 2 is a diagram that represents a state of the mobile robot 200 according to an example embodiment. In this example, the mobile robot 200 performs state estimation and generates state data 204, which is represented by (x, y, θ), where x and y are cartesian position coordinates of the mobile robot 200 and where θ is an orientation of the mobile robot 200. In this case, x, y, and θ are relative to some reference location 202 (e.g., a target location, a goal, etc.). As an example, the reference location 202 refers to a location of a docking station of the mobile robot 200. In this regard, FIG. 2 illustrates the mobile robot 200 in relation to these parameters.

Precise navigation requires accurate and robust state estimation, coupled with effective path-planning and control strategies. The system 100 (e.g., the motion planner 106) receives the state data 204, represented as (x, y, θ), as input data and is configured to generate control commands, represented as (v, w), as output data. With respect to the output data, v represents linear velocity and w represents angular velocity.

More specifically, as an example, the mobile robot 200 may be a rover, which performs smart-docking maneuvers on the surface of the moon. In this case, the rover is initialized with a rough state estimate, some distance, D, away from a stationary charging coil. The rover is configured to autonomously perform precise navigation to and docking with the charging coil, despite the possible existence of negative environmental factors (e.g., low-light conditions, high glare/reflectivity on the fiducial marker, lunar dust obscuring part of the rover's camera lens, etc.).

As aforementioned, the system 100 is configured to provide the mobile robot 200 with robust state estimation using at least wireless features and visual inputs. The system 100 is configured to perform state estimation by generating state estimation from visual inputs, generating state estimation from wireless features, and generating state data by fusing the state estimation from visual inputs and the state estimation from wireless features, as described below.

State Estimation from Visual Inputs

The visual input module 118 include both visual odometry and fiducial tag-based state estimation. Visual odometry is a technique used to estimate the position and orientation of a camera or a mobile robot 200 by analyzing visual information from consecutive frames. Visual odometry involves tracking visual features, calculating their displacements, and inferring the camera or the mobile robot's state in real-time. The fiducial tag-based modality is useful in near-range positioning tasks of the mobile robot 200 in which a tag is located at a target position, and also some far-range applications like in warehouses where several tags are mounted at intermediate locations. The mobile robot 200 considers this method only when the tag comes into camera's field of view and is detected. Otherwise, visual odometry is the default method for providing visual input to the rest of the system 100.

State Estimation from Wireless Features

As stated earlier, the system 100 uses RSSI, FTM, and CSI wireless features to determine a position and an orientation of the mobile robot 200. Wi-Fi Received Signal Strength Indicator (RSSI) indicates the power level associated with a wireless packet reception. Round Trip Time (RTT) is the time required for a packet to travel from a specific source to a specific destination and back again using wireless signals. This can be used to find the distance between two Wi-Fi chips, by leveraging a process called Fine Time Measurement (FTM) and is a part of IEEE 802.11 mc protocol. Channel State Information (CSI) captures the channel properties of a communication link. CSSI data describes how a signal propagates from a transmitter to a receiver and can represent the combined effect of scattering, fading, and power decay with distance. Therefore, CSSI data contains geometric information of the propagation space.

In an example, for wireless state estimation, the system 100 includes two separate modules for position and orientation estimation. For instance, in an example, the system 100 includes (i) a wireless position-estimate module and (ii) a wireless orientation-estimation module. More specifically, the system 100, via the wireless position-estimation module, is configured to infer 1D position (r) and 2D positions (x, y), where (r) represents the distance between the robot and its target destination and (x, y) represents the robot's cartesian coordinates with respect to its target location or reference location, which may be defined as (0,0).

For 1D position estimation, the system 100, via the wireless position-estimation module, is configured to leverage RSSI and FTM for determining the distance of the robot with respect to its target destination. By definition, RSSI and FTM are both configured to give estimates of the distance from a transmitter (TX) to a receiver (RX). Therefore, placing a TX near the target destination and an RX on the mobile robot 200 gives the distance between them. RSSI may be used to estimate distance by leveraging Free Space Friis Model, Flat Earth Model, and Linear Approximation Model. FTM data may be collected at different distances, and a regression model (e.g., a linear-, polynomial, or k-NN regressor) are trained to infer distance, based on the FTM readings.

For 2D position estimation, the system 100, via the wireless position-estimation module, is configured to leverage CSI data for determining the (x, y) coordinate of the mobile robot 200 with respect to the target destination. This may be performed in multiple ways. For example, if there are multiple antennas attached to the receiver (e.g., the robot), it can estimate the Angle of Arrival (AoA) by using the MUltiple Signal Classification algorithm (MUSIC); this algorithm leverages information from the CSI phase difference, across antennas. An estimate of the AoA q with an estimate of the distance r, using RSSI and FTM (as mentioned above), can be used to determine (x, y) by calculating x=r*sin (q) and y=r*cos (q). Alternatively, CSI data can be collected at different positions, along with the corresponding (x, y) location data from ground-truth (if available) or by using robust fiducial markers. Using this pairwise information of CSI and corresponding ground-truth position, the system 100, via the wireless position-estimation module, is configured to train a classifier (e.g., k-NN, SVM) to map observed CSI information to an estimate of the mobile robot's (x, y) coordinate.

In addition, the system 100 includes the wireless orientation-estimation module. The system 100, via the wireless orientation-estimation module is configured to leverage wireless channel state information (CSI) as an effective feature for determining the orientation of the robot. In an example, the system 100, via the wireless orientation-estimation module, is configured to apply 2D MUSIC on the joint Angle of Arrival (AoA) and Angle of Departure (AoD), in order to determine the orientation (heading) using CSI values. Alternatively, pairwise CSI data can be collected at different known (x, y) coordinates or by using robust fiducial markers. Using this pairwise information, the system 100, via the wireless orientation-estimation module, is configured to train a classifier, e.g., k-Nearest Neighbors (kNN), a Neural Network (NN), or a Support Vector Machine (SVM), to classify the (x, y) coordinate of the robot using CSI data.

FIG. 3 shows a visualization 300 of a graphical representation of some sample data comprising CSI data. As shown in FIG. 3, the visualization 300 includes an axis relating to a number of subcarriers, an axis relating to a number of packets, and an axis relating to amplitude. The CSI data is indicative of the channel properties of a communication link and contains geometric information of the propagation space. In this regard, the CSI data is configured to provides a signature pattern or wireless fingerprinting information that is indicative of a particular location.

FIG. 4 illustrates an example of a wireless chip 400 according to an example embodiment. The wireless chip 400 includes a transmitter (TX) and receiver (RX). As a non-limiting example, the wireless chip 400 comprises Wi-Fi 2.4 GHz on an ESP32 wireless chip. To enable Wi-Fi FTM, the transmitter sends Wi-Fi packets, which are received by the receiver. The transmitter and the receiver may be swapped. Additionally or alternatively, the transmitter and the receiver may take turns transmitting and receiving.

Figure 5:
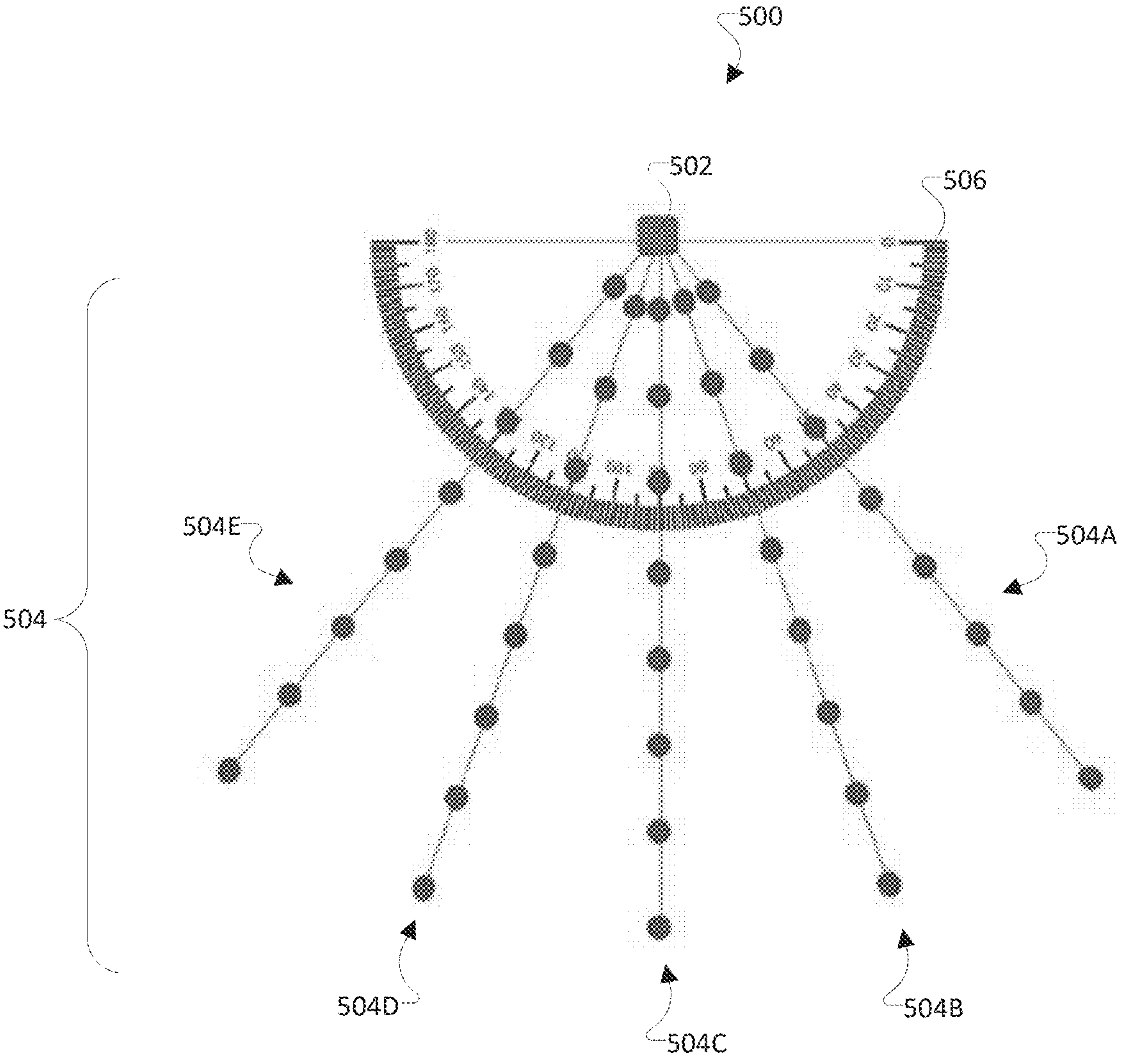
FIG. 5 is a diagram of an example of a visualization of a set of points with known state data according to an example embodiment of this disclosure.

FIG. 5 illustrates a visualization 500 of an example of a set of points with known state data (i.e., position and orientation) according to an example embodiment. More specifically, FIG. 5 illustrates a set 504 of points, which are predefined as a triangular grid of points with respect to a wireless access point (AP) 502. The set 504 of points include a number of subsets of points. A subset of points is aligned at a particular angle, as shown by the protractor 506 (or angle measuring tool), with uniform spacing between two adjacent points on the same line. For instance, in the non-limiting example shown in FIG. 5, the triangular grid includes (i) a subset 504A of points aligned at 70 degrees, (ii) a subset 504B of points is aligned at 90 degrees, (iii) a subset 504C of points aligned at 90 degrees, (iv) a subset 504D of points aligned at 110 degrees, and (v) a subset 504E of points aligned at 130 degrees.

In this example, one or more transmitters may be placed in this region (e.g., a surrounding of the mobile robot 200) and a receiver may be placed at one of the grid points to collect data for supervised learning. More specifically, a transmitter initiates an FTM request to a receiver on a particular Wi-Fi channel. In a non-limiting example, at each point, there is a collection of more than 2000 Wi-Fi packets that contain FTM, RSSI, and CSI values. This collection may take around 3 minutes at each point in an example implementation. After collecting this data, a machine learning system is trained. The machine learning system includes at least one machine learning model. As an example, the machine learning model comprises a k-Nearest Neighbors (kNN) or Neural Network (NN) model. The machine learning system is configured to receive FTM data, RSSI data, and CSI data as input and generate state data (or a position estimate) as output data. More specifically, the machine learning system is configured to generate 1D position data (e.g., orientation) as output using the FTM data and RSI data as input. In addition, the machine learning system is configured to generate 2D position data (e.g., cartesian coordinates indicating location) as output using CSI data as input.

Figure 6:
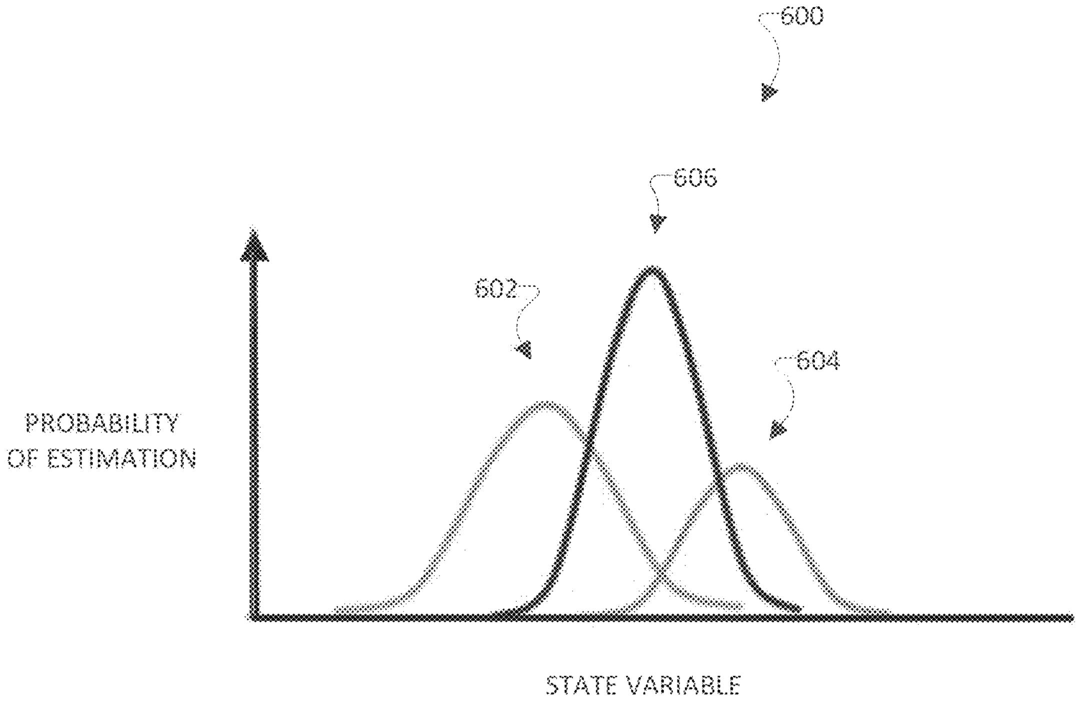
FIG. 6 is a diagram of an example of a graph illustrating aspects of fusion according to an example embodiment of this disclosure.

FIG. 6 illustrates a graph 600, which includes an axis indicative of a probability of estimation and an axis indicative of a state variable. In addition, this graph illustrates aspects of fusing according to an example embodiment.

More specifically, upon generating the position data and the orientation using visual input and wireless features, the system 100 fuses the state data of the visual input and the state data of the wireless feature together to accurately determine current state data of the mobile robot 200. The fusing is performed via Bayesian filters, with the assumption that the probability distributions, which capture uncertainty in the three aforementioned modalities (e.g., visual odometry, wireless features, and visual input), are known. Bayesian filters have different variants, such as Kalman Filter, Extended Kalman Filter (EKF), Unscented Kalman Filter (UKF), and Particle Filter. The selection among these different variants depends on factors like robot dynamics, noise characteristics, computational requirements, etc. In the event that the state estimation from a certain modality is no longer available or reliable (e.g., the camera is not working), then the estimation from the another modality is used for state estimation. In this way, the state estimation becomes more robust. In general, the fusion in these filters involves at least two steps: i) a prediction step and ii) an update step.

The system 100 considers the state from visual odometry as "prediction" and the state from wireless features along with fiducial tag as "measurement." The update step combines the prior distribution 602 associated with "prediction" and the likelihood 604 associated with "measurement" to compute the posterior distribution 606, which provides an optimal estimate along with the associated uncertainty. Overall, the position estimation from both the aforementioned prediction step and the measurement step combine to give a more accurate position estimate than either one, when taken alone, as shown in FIG. 6. In this regard, as shown in FIG. 6, the peak of the posterior distribution 606 indicative of the probability of estimation is greater than the peak of the prior distribution 602 indicative of the probability of estimation. Also, the peak of the posterior distribution 606 indicative of the probability of estimation is greater than the peak of the likelihood 604 indicative of the probability of estimation.

Figure 7:
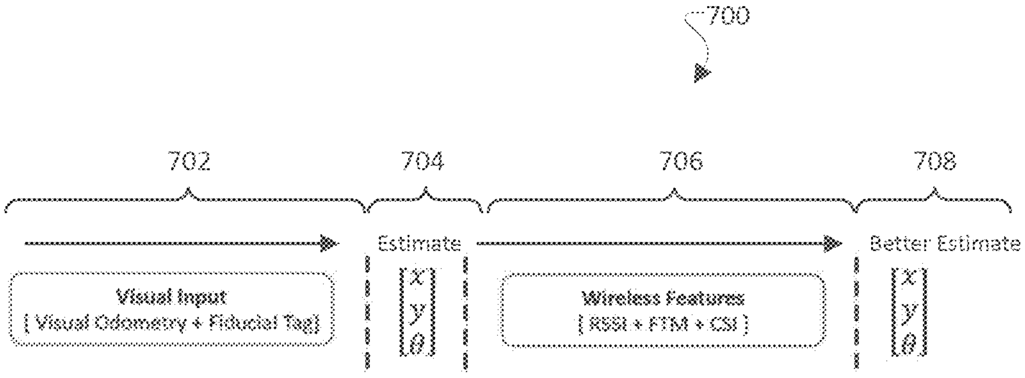
FIG. 7 is a diagram of an example of a pipeline that illustrate aspects of generating state data based on fusion according to an example embodiment of this disclosure.

FIG. 7 shows an example of an overview of a pipeline 700 for generating state data using visual input and wireless features. The pipeline 700 includes a number of stages to generate state data, which includes a position estimate (x, y, θ). As an example, the pipeline 700 includes stage 702, stage 704, stage 706, and stage 708. For instance, in FIG. 7, the pipeline 700 may include stage 702, stage 704, stage 706, and stage 708 in sequential order.

At stage 702, according to an example, the pipeline 700 includes receiving visual input data. In this case, the visual input data includes visual odometry data and fiducial tag data. At stage 704, according to an example, the pipeline 700 includes generating a first position estimate (x, y, θ), using the visual input data. At stage 706, according to an example, the pipeline 700 includes receiving wireless features. In this case, the wireless features include RSSI data, FTM data, and CSI data. In addition, a second position estimate (x, y, θ) is generated using the wireless features At stage 708, according to an example, the pipeline 700 includes generating state data (x, y, θ), which is a better position estimate than the first position estimate itself. In addition, the state data is a better estimate than the second position estimate itself. The state data is generated by fusing/combining the first position estimate and the second position estimate (e.g., fusing/combining the visual input and wireless features).

Figure 8:
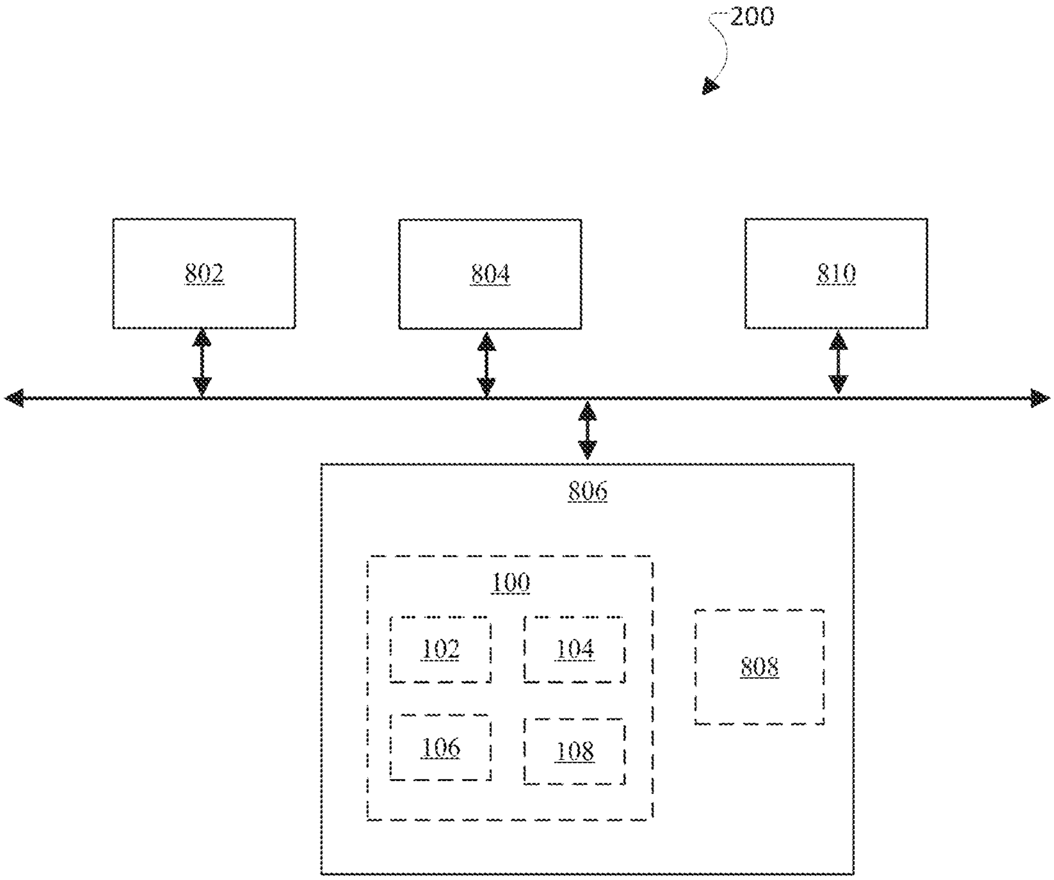
FIG. 8 is a block diagram that illustrates an example of a mobile robot according to an example embodiment of this disclosure.

FIG. 8 is a block diagram of an example of the mobile robot 200 according to an example embodiment. More specifically, the mobile robot 200 includes at least a processing system 802 with at least one processing device. For example, the processing system 802 includes at least an electronic processor, a central processing unit (CPU), a graphics processing unit (GPU), a Tensor Processing Unit (TPU), a microprocessor, a field-programmable gate array (FPGA), an application-specific integrated circuit (ASIC), any suitable processing technology, or any number and combination thereof. The processing system 802 is operable to provide the functionality as described herein.

The mobile robot 200 is configured to include at least one sensor system 804. The sensor system 804 senses the environment and generates sensor data based thereupon. The sensor system 804 is in data communication with the processing system 802. The sensor system 804 is also directly or indirectly in data communication with the memory system 806. The sensor system 804 includes a number of sensors. As aforementioned, the sensor system 804 includes various sensors of various sensor modalities. For example, the sensor system 804 includes at least an image sensor (e.g., a camera), a wireless sensor (e.g., Wi-Fi 2.4 GHz on an ESP32 wireless chip), IMU technology (e.g., accelerometer, a gyroscope, a magnetometer, etc.), a light detection and ranging (LIDAR) sensor, a radar sensor, wheel encoders, a motion capture system, any applicable sensor, or any number and combination thereof. Also, the sensor system 804 may include a thermal sensor, an ultrasonic sensor, an infrared sensor, a motion sensor, or any number and combination thereof. The sensor system 804 may include a satellite-based radio navigation sensor (e.g., GPS sensor). In this regard, the sensor system 804 includes a set of sensors that enable the mobile robot 200 to sense its environment and use that sensing information to operate effectively in its environment.

The mobile robot 200 includes a memory system 806, which is in data communication with the processing system 802. In an example embodiment, the memory system 806 includes at least one non-transitory computer readable storage medium, which is configured to store and provide access to various data to enable at least the processing system 802 to perform the operations and functionality, as disclosed herein. The memory system 806 comprises a single memory device or a plurality of memory devices. The memory system 806 may include electrical, electronic, magnetic, optical, semiconductor, electromagnetic, or any suitable storage technology that is operable with the mobile robot 200. For instance, the memory system 806 includes random access memory (RAM), read only memory (ROM), flash memory, a disk drive, a memory card, an optical storage device, a magnetic storage device, a memory module, any suitable type of memory device, or any number and combination thereof.

The memory system 806 includes at least the system 100, which includes at least the environment module 102, the perception module 104, the motion planner 106, and the control system 108. In addition, the memory system 806 includes other relevant data 808. The system 100 and the other relevant data 808 are stored on the memory system 806. The system 100 includes computer readable data. The computer readable data includes instructions. In addition, the computer readable data may include various code, various routines, various related data, any software technology, or any number and combination thereof. The instructions, which, when executed by the processing system 802, is configured to perform at least the functions described in this disclosure. Meanwhile, the other relevant data 808 provides various data (e.g., operating system, etc.), which relate to one or more components of the mobile robot 200 and enables the mobile robot 200 to perform the functions as discussed herein.

In addition, the mobile robot 200 includes other functional modules 810. For example, the other functional modules 810 include a power source (e.g., one or more batteries, etc.). The power source may be chargeable by a power supply of a docking station. The other functional modules 810 include communication technology (e.g., wired communication technology, wireless communication technology, or a combination thereof) that enables components of the mobile robot 200 to communicate with each other, communicate with one or more other communication/computer devices, or any number and combination thereof. The other functional modules 810 may include one or more I/O devices (e.g., display device, speaker device, etc.).

Also, the other functional modules 810 may include any relevant hardware, software, or combination thereof that assist with or contribute to the functioning of the mobile robot 200. For example, the other functional modules 810 include a set of actuators, as well as related actuation systems. The set of actuators include one or more actuators, which relate to enabling the mobile robot 200 to perform one or more of the actions and functions as described herein. For example, the set of actuators may include one or more actuators, which relate to driving wheels of the mobile robot 200 so that the mobile robot 200 is configured to move around its environment. The set of actuators may include one or more actuators, which relate steering the mobile robot 200. The set of actuators may include one or more actuators, which relate to a braking system that stops a movement of the wheels of the mobile robot 200. Also, the set of actuators may include one or more actuators, which relate to other actions and/or functions of the mobile robot 200. In general, the other functional modules 810 include various components of the mobile robot 200 that enable the mobile robot 200 to move around its environment, and optionally perform one or more tasks in its environment.

As described in this disclosure, the system 100 provides several advantages and benefits. For example, the system 100 includes at least a fusion model, which is advantageously configured to operate reliably in various environments. More specifically, as indicated in TABLE 1, the fusion model is configured to operate reliably on Earth, Mars, and the moon. In addition, the fusion is configured to operate reliably in various outdoor environments (e.g., various places where GPS is unreliable or unavailable, etc.) on Earth and various indoor environments (e.g., warehouses, residential homes, etc.). Moreover, the state data (e.g., position estimate) provided by the fusion model is better (e.g., more accurate and more reliable) than a position estimate of the visual input itself. The state data (e.g., position estimate) provided by the fusion model is better (e.g., more accurate and more reliable) than a position estimate of the wireless features itself. Accordingly, by generating this better state data via the fusion model, the mobile robot 200 is configured to navigate in more effectively and efficiently.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method for operating a mobile robot with respect to a reference location, the computer-implemented method comprising:

generating first state data using first sensor data obtained from a first set of sensors, the first set of sensors relating to a first sensor modality;

generating second state data using second sensor data obtained from a second set of sensors, the second set of sensors providing wireless sensing and the second state data being generated from wireless features of the second sensor data, the wireless features include fine time measurement (FTM) data;

generating a first distribution of the first state data;

generating a second distribution of the second state data;

computing a posterior distribution by fusing the first distribution and the second distribution;

generating, via a machine learning model, position data as output upon receiving the wireless features as input, the position data including a distance of the mobile robot with respect to the reference location;

generating optimal state data along with associated uncertainty data using the posterior distribution, the optimal state data including a position estimate of the mobile robot, the position estimate including the position data; and controlling the mobile robot using at least the optimal state data, wherein the machine learning model is a regression model.

2. The computer-implemented method of claim 1, wherein the first set of sensors are configured to perform visual odometry and fiducial tag sensing.

3. The computer-implemented method of claim 1, wherein:

the wireless features further include at least received signal strength indicator (RSSI) data.

4. The computer-implemented method of claim 3, wherein:

the wireless features further include at least channel state information (CSI) data.

5. The computer-implemented method of claim 1, wherein:

the wireless features further include at least channel state information (CSI) data; and the position estimate further includes an orientation of the mobile robot with respect to the reference location.

6. A computer-implemented method for operating a mobile robot with respect to a reference location, the computer-implemented method comprising:

generating first state data using first sensor data obtained from a first set of sensors, the first set of sensors relating to a first sensor modality;

generating second state data using second sensor data obtained from a second set of sensors, the second set of sensors providing wireless sensing and the second state data being generated from wireless features of the second sensor data;

generating a first distribution of the first state data;

generating a second distribution of the second state data:

computing a posterior distribution by fusing the first distribution and the second distribution:

generating, via a machine learning model, two-dimensional (2D) position data as output upon receiving the wireless features as input;

generating optimal state data along with associated uncertainty data using the posterior distribution, the optimal state data including a position estimate of the mobile robot; and controlling the mobile robot using at least the optimal state data, wherein, the machine learning model is a classifier;

the wireless features include channel state information (CSI) data; and the position estimate includes the 2D position data.

7. The computer-implemented method of claim 6, wherein:

the first set of sensors is configured to perform fiducial tag sensing;

the first state data includes first position data of the mobile robot; and the machine learning model uses the first state data as ground truth data.

8. The computer-implemented method of claim 7, further comprising:

receiving current sensor data from the second set of sensors;

extracting current wireless features from the current sensor data; and generating, via the machine learning model, current 2D position data as output upon receiving the current wireless features as input, wherein the position estimate is updated to the current 2D position data.

9. A system comprising:

one or more processors; and one or more memory in data communication with the one or more processors, the one or more memory including computer readable data stored thereon, the computer readable data including instructions that, when executed by the one or more processors, causes the one or more processors to perform a method for operating a mobile robot with respect to a reference location, the method including generating first state data using first sensor data obtained from a first set of sensors, the first set of sensors relating to a first sensor modality;

generating second state data using second sensor data obtained from a second set of sensors, the second set of sensors providing wireless sensing and the second state data being generated from wireless features of the second sensor data, the wireless features include channel state information (CSI) data;

generating a first distribution of the first state data;

generating a second distribution of the second state data;

computing a posterior distribution by fusing the first distribution and the second distribution;

generating, via a machine learning model, two-dimensional (2D) position data as output upon receiving the wireless features as input;

generating optimal state data along with associated uncertainty data using the posterior distribution, the optimal state data including a position estimate of the mobile robot, the position estimate including the 2D position data; and generating a control command to control the mobile robot using at least the optimal state data, wherein, the machine learning model is a classifier, and the mobile robot is configured to be controlled according to the control command.

10. The system of claim 9, wherein the first set of sensors are configured to perform visual odometry and fiducial tag sensing.

11. The system of claim 9, wherein the wireless features further include at least received signal strength indicator (RSSI) data.

12. The system of claim 9, wherein the wireless features further include at least fine time measurement (FTM) data.

13. The system of claim 9, wherein the position estimate further includes an orientation of the mobile robot with respect to the reference location.

14. A system comprising:

one or more processors; and one or more memory in data communication with the one or more processors, the one or more memory including computer readable data stored thereon, the computer readable data including instructions that, when executed by the one or more processors, causes the one or more processors to perform a method for operating a mobile robot with respect to a reference location, the method including generating first state data using first sensor data obtained from a first set of sensors, the first set of sensors relating to a first sensor modality;

generating second state data using second sensor data obtained from a second set of sensors, the second set of sensors relating to a second sensor modality, the second set of sensors providing wireless sensing and the second state data being generated from wireless features of the second sensor data, the wireless features including fine time measurement (FTM) data;

generating a first probability distribution of the first state data;

generating a second probability distribution of the second state data;

computing a posterior distribution by performing a probabilistic fusion of the first probability distribution and the second probability distribution;

generating, via a machine learning model, position data as output upon receiving the wireless features as input, generating optimal state data along with associated uncertainty data using the posterior distribution, the optimal state data including a position estimate of the mobile robot, the position estimate including the position data, the position data including a distance of the mobile robot with respect to the reference location; and generating at least one control command to control the mobile robot using at least the optimal state data, wherein, the machine learning model is a regression model, and the mobile robot is configured to be controlled according to the at least one control command.

15. The system of claim 14, wherein the first set of sensors are configured to perform visual odometry and fiducial tag sensing.

16. The system of claim 14, wherein the wireless features further include at least received signal strength indicator (RSSI) data.

17. The system of claim 14, wherein the wireless features further include at least channel state information (CSI) data.

18. The system of claim 14, wherein the probabilistic fusion is performed via Bayesian filters.

* * * * *